US010210957B2

(12) United States Patent
Lacalle Bayo et al.

(10) Patent No.: US 10,210,957 B2
(45) Date of Patent: Feb. 19, 2019

(54) PORTABLE APPARATUS FOR THE BORATION OF CONTINUOUSLY FLOWING WATER

(71) Applicant: INGENIERIA Y MARKETING, S.A., Valencia (ES)

(72) Inventors: Jesús Lacalle Bayo, Valencia (ES); Amparo Trinidad Ponce Serrano, Valencia (ES); Judith Troeung, Valencia (ES); Belén Lopez Lopez, Valencia (ES); Daniel Alcaraz Pieters, Valencia (ES)

(73) Assignee: Ingenieria Y Marketing, S.A., Valencia (ES)

( * ) Notice: Subject to any disclaimer, the term of this patent is extended or adjusted under 35 U.S.C. 154(b) by 344 days.

(21) Appl. No.: 15/038,778

(22) PCT Filed: Nov. 26, 2013

(86) PCT No.: PCT/ES2013/070820
§ 371 (c)(1),
(2) Date: May 24, 2016

(87) PCT Pub. No.: WO2015/079075
PCT Pub. Date: Jun. 4, 2015

(65) Prior Publication Data
US 2017/0076825 A1 Mar. 16, 2017

(51) Int. Cl.
*B01F 5/10* (2006.01)
*B01F 1/00* (2006.01)
(Continued)

(52) U.S. Cl.
CPC .............. *G21C 7/22* (2013.01); *B01F 1/0011* (2013.01); *B01F 1/0022* (2013.01); *B01F 5/104* (2013.01);
(Continued)

(58) Field of Classification Search
CPC . G21C 7/22; G21C 9/033; G21D 3/04; G21D 1/02; B01F 1/0022; B01F 1/0011;
(Continued)

(56) References Cited

U.S. PATENT DOCUMENTS 3,830,473 A * 8/1974 Lieferman .............. C08B 30/16
366/136
4,582,672 A 4/1986 Tuley, Jr. et al.
(Continued)

FOREIGN PATENT DOCUMENTS

CA 1136778 A 11/1982
DE 3618966 A1 12/1987
(Continued)

*Primary Examiner* — Charles Cooley
(74) *Attorney, Agent, or Firm* — Richard M. Goldberg (57) ABSTRACT

A portable apparatus for borating a continuous flow of water includes metering assemblies provided with corresponding grinders and feeders; a feeder for supplying water to the circuit; a meter and/or flow regulator for adapting the concentration of the products supplied to the water; a pumping arrangement for conveying the mixture to a mixing reactor; a reactor with a mechanical mixer; a recirculation line of the mixer; and a supply pumping arrangement, preferably forming two units in independent cages or containers, including a crane arrangement for supplying the boration products in big bags.

11 Claims, 7 Drawing Sheets

(51) Int. Cl.
  *G21C 7/22* (2006.01)
  *G21D 1/02* (2006.01)
  *G21D 3/04* (2006.01)
  *G21C 9/033* (2006.01)

(52) U.S. Cl.
  CPC ............... *G21C 9/033* (2013.01); *G21D 1/02* (2013.01); *G21D 3/04* (2013.01); *B01F 2215/008* (2013.01); *G21Y 2004/504* (2013.01); *Y02E 30/39* (2013.01)

(58) Field of Classification Search
  CPC ...... B01F 5/104; B01F 2215/008; B01F 5/10; B01F 5/106; B01F 5/108; B01F 15/00772; G21Y 2004/504; Y02E 30/39
  USPC .......................................... 366/136, 137, 306
  See application file for complete search history.

(56) References Cited

U.S. PATENT DOCUMENTS

| | | | | |
|---|---|---|---|---|
| 4,798,471 A | * | 1/1989 | Laempe | B01F 11/0054 366/65 |
| 4,844,856 A | | 7/1989 | Cohen et al. | |
| 4,898,474 A | * | 2/1990 | Lipson | B01F 7/161 366/199 |
| 5,383,726 A | * | 1/1995 | Lanaro | B01F 1/0011 366/172.1 |
| 5,779,360 A | * | 7/1998 | Tanaka | B01F 7/161 366/286 |
| 6,568,842 B1 | * | 5/2003 | Murray | B01F 5/0647 366/137 |
| 6,994,464 B2 | * | 2/2006 | Villwock | B01D 19/0052 366/136 |
| 2002/0057625 A1 | * | 5/2002 | Russell | A61M 1/1656 366/136 |
| 2010/0239062 A1 | | 9/2010 | Yeon et al. | |
| 2017/0076825 A1 | * | 3/2017 | Lacalle Bayo | G21C 7/22 |

FOREIGN PATENT DOCUMENTS

| | | |
|---|---|---|
| EP | 404276 A1 * | 12/1990 |
| EP | 2600351 A1 | 6/2013 |
| FR | 2800504 A1 | 5/2004 |
| GB | 2497756 A | 6/2013 |
| JP | 2012-83113 A | 4/2012 |
| KR | 20120039161 A | 4/2012 |
| SE | 9800940 A | 3/1999 |
| WO | 2013158691 A1 | 10/2013 |

* cited by examiner

PORTABLE APPARATUS FOR THE BORATION OF CONTINUOUSLY FLOWING WATER

BACKGROUND OF THE INVENTION

This invention refers to an apparatus for dissolving boron compounds in a continuous flow of water for treatment and protection from radiation in nuclear emergency situations.

The problem that arose at the nuclear power plant in Fukushima, Japan is well known, when the lack of cooling of the different reactors brought about a breakdown in control of the reaction, with the consequences that we are all aware of, triggering diffusion of radioactivity in the whole area, having to evacuate the civil population.

Nuclear power stations make use of a reaction which is catalysed by means of submerging the fuel in a borated water solution. Boron is a neutron capturer which proves ideal for reducing radiation and neutralising the reaction of the nuclear fuel. The use of boron solutions in accordance with the boron concentration in the water enables the fission reaction to be kept stable, increased, or means the reaction can be halted when concentrations are too high.

Primary and secondary circuits and storage pools are cooled with borated water.

At power plants there are usually storage tanks filled with water with dissolved boron compounds, for example boric acid, normally kept at a certain temperature to prevent precipitation and keep the required concentration. These tanks are nevertheless small in size and not able to supply a continuing flow for longer than a few hours in the event of this proving necessary.

It is therefore possible for the installations for supplying borated water not to be available for their use on a sufficient scale at times of emergency when this is required, for which reason there needs to be an external means of supplying borated water for keeping the systems cool and reducing the reaction.

The safety systems of a nuclear power plant include a set of electric accumulators which are able to supply all the systems for a few dozen hours, and also a set of generators, normally activated by diesel engines, which are immediately and automatically activated when any fault in the electricity supply at the plant is detected.

Hence this external cooling will not normally be vital for the first few hours, for which reason it is enough to have the system available some hours after the fault at the plant takes place.

The invention thus proposes a mobile installation for supplying borated water in a continuous flow, comprising means for supplying the water and a device for mixing the relevant components and pumping devices, all contained in cages or containers, for example, 20-foot containers.

STATE OF THE ART

KR 2012 0039161 discloses an apparatus for automatic control of the boron concentration at a nuclear reactor to perform the required daily loading.

This comprises a temperature indicator, a signal for energy distribution in axial direction and a signal for the position of a control rod.

SE 98 00940 A describes a system for shutting down a PWR or BWR nuclear reactor, in which there are devices which enable boron to be fed into the coolant. It also describes a method for this shutdown which includes adding boron to the coolant in order to reduce the radioactivity levels in the core of the reactor.

JP 2012 083113 describes a control device which controls boron concentration and flow in a tank for controlling the volume of coolant which has to be supplied to the reactor. This determines the mixing ratio between a boric acid solution and a target concentration of the primary circuit coolant.

DE 3618966 A1 describes a device for safeguarding the fuel chamber of a nuclear reactor against overheating. It supplies a neutron-absorbent material, made up of granules of oxides or salts with a high neutron-absorption capacity, made up of silica, sodium oxide, gadolinium oxide and boron oxide, amongst others.

U.S. Pat. No. 4,844,856 A describes a process for automatic regulation of the soluble boron content in the cooling water of a pressurised nuclear reactor; the boration regions of the boration means and the dissolution means are determined a priori, in correspondence with pairs of valves of two control parameters, in respect of the position of the regulation group of the reactor in the core and the deviation of axial energy imbalance.

U.S. Pat. No. 4,582,672 A describes a method for preventing inadvertent criticality in a nuclear fuel electrical energy-generating unit, in which water with a large amount of boron is injected into the reactor, to keep the reactor in subcritical conditions.

CA 1136778 A1 describes a device for adding boron to the coolant in the primary circuit of a water-cooled nuclear reactor system. Boric acid is injected into the primary circuit coolant in order to guarantee reactivity shutdown in the event of an accident. The method comprises heating molten boric acid and a water solution in a storage vessel creating sufficient pressure for the vapour cushion generated to inject the solution into the reactor's coolant.

Although all these inventions consider different ways of introducing borated water into the reactor, all of them are integrated in the ordinary work process at the plant. Hence they do not solve the problem in the event of there being any control breakdown or a catastrophe at the plant, when there need to be large amounts of borated water available, without this being able to depend on the installations of the plant itself, as these could cease to be operative.

SUMMARY OF THE INVENTION

This invention consists of an apparatus for borating a continuous flow of water, which can easily be transported and put into action quickly, merely by connecting the relevant conduits and the power supply, such as a portable generator.

The apparatus is made up of the following items:
dispensing assemblies, provided with the necessary crushers and feeders,
a feeder into the water circuit,
a flow gauge and/or regulator for adapting the concentration of the products supplied to the water,
a pumping system for taking the mixture to a mixer;
a mechanical mixer;
a recirculation line of the mixer;
means for supply pumping.

It is also designed for the apparatus itself to have a means of supplying the boron compounds or other components. These compounds are supplied in large packages, which are known as "big bags", normally holding 1000 kg of product. Obviously these amounts cannot be handled manually, for which reason the supply system includes a handling crane.

As preferred, this apparatus is made up mainly of two units:
- A first unit, comprising a dispensing mechanism, and a loading device for the dispensing mechanism; and
- A second unit, comprising a mixing mechanism and the pumping means for discharging the solution towards the installation where this is needed.

The units are able to be connected together by means of the relevant conduits, each of said units preferably being set in a cage or carrying container.

As has already been stated, each of these units is integrated in a cage or container, whose dimensions are such that this can be moved on a standard truck, or form part of or be integrated in a trailer, to be easily pulled along. Other means of transport are obviously considered, such as air transport, for example by helicopter, when the situation requires immediate action.

The first unit is made up of two parts: a lower part, which carries the set of items, and an upper part which holds the roof, and which can be telescopically lifted by mechanical, hydraulic, pneumatic or electric means, from a first transport position, to a second, operating position.

Since the components of the mix are supplied in large-capacity sacks, known as "big bags", holding around 1000 Kg, there needs to be a means of supply which rules out the need for additional machinery in order to work.

At least said first unit, for supply and dosage, has at least one crane built into this. A crane is preferably included for each dispenser. The crane has been designed to be integrated in the roof, so that when the roof lifts this provides room to move the containers of product under this. This crane is a sliding element, and is made up of a track along which a hoist is moved. It is intended for this track to be made up of a longitudinal beam, which can be retracted, if this is telescopic, or folded, if this is hinged, when in the transport position.

In accordance with the invention, there are two pouring lines in the supply and dosage unit for the components that have to be inserted into the water to be dissolved. One of these components is usually boric acid ($H_3BO_3$), in which a water solution has a very low pH. Since it is not desired for the fluids circulating in the reactor and in the auxiliary circuits to have too low a pH, this low pH due to the boric acid has to be corrected by adding a basic component. This basic component can be sodium hydroxide (NaOH), or preferably a borated salt, such as sodium tetraborate (Borax).

In any event, the idea is to obtain a pH close to 7, and preferably a little higher, so that the acid corrosion processes in the different circuits are minimised.

Each of the products will be located on a supply unit; each supply unit is made up of a reception hopper, in which there are load and level sensors; the hoppers could be vibrated to break up any lumps, and could also have a crushing device to grind the granules and facilitate later dissolving.

In each supply unit there is a feeder, possibly made up of a worm gear, whose speed is synchronised with that of other feeders depending on the required concentrations of each product. When a hopper is almost empty, the system will emit an alarm signal, so that a further bag of product can be supplied by the crane of the feeder unit.

The supply units, normally two of these, converge in a reception unit, in turn provided with sensor means and a corresponding feeder to a water supply line.

This water supply line is provided with the corresponding filtration means to prevent any impurities from getting into the circuit, and this is provided with heating means if the water is outside the appropriate temperature ranges; these will be unsuitable when the water is under 4° C., in which case the heating means will have to be activated. This will furthermore comprise a flow meter to determine the amount of product mix which has to be supplied.

In the zone for supplying the mix of products into the water flow the water pressure is close to atmospheric pressure, so the supply can be added by pouring in. After this there are pumping means to a solution tank or reactor. This reactor comprises:
- A main entry line, for the flow of water provided with the borated compounds; the products are premixed with the inlet effluent in this line;
- A recirculation line;
- A supply line;
- A motor integrated in a hollow made in the top;
- Venting ducts provided with filters;
- An agitation paddle connected to the upper motor, with access holes for cleaning;
- A protective insulating envelope, which allows a minimum temperature drop in the inside of the reactor, in the event of the outside temperature being extremely low;

Although this is not designed in the main embodiment, the reactor, the inlet line and/or some of the components could have heating means to guarantee the supply conditions.

In accordance with one embodiment, the agitation paddle consists of an impeller, made up of a disk perpendicular to the rotation axis, provided with radial vanes perpendicular to said disk.

Hence, in accordance with predetermined parameters, the inlet flow is measured and the amount of product mix is added to said flow, which is led to the mixing tank, and the flow required for the specific application is taken out, the rest being recirculated in the mixing tank.

BRIEF DESCRIPTION OF THE DRAWINGS

In order to illustrate the following explanation, we are enclosing with this descriptive report seven sheets of drawings, in which eight figures represent the essence of this invention as an example, without constituting any limitation, and in which.

DESCRIPTION OF THE PREFERRED EMBODIMENT OF THE INVENTION

The invention, as has been described, consists of an apparatus for borating water in continuous flow, to be used particularly in nuclear installations, through the neutrophagous power of boron.

In accordance with a preferred embodiment, the apparatus is made up of two main units, to wit:

A first unit (1) for dispensing; this first unit comprises a dispensing mechanism (11,12,13), and a device for loading the dispensing mechanism; and A second unit (2), comprising a mixing mechanism (21) and the required pumping means (5,16,17).

According to another embodiment it would be possible to integrate both these units (1,2) in a single assembly, though for mobility reasons this is not so preferable; in this case the connections between the two units could be permanent.

Figure 1:
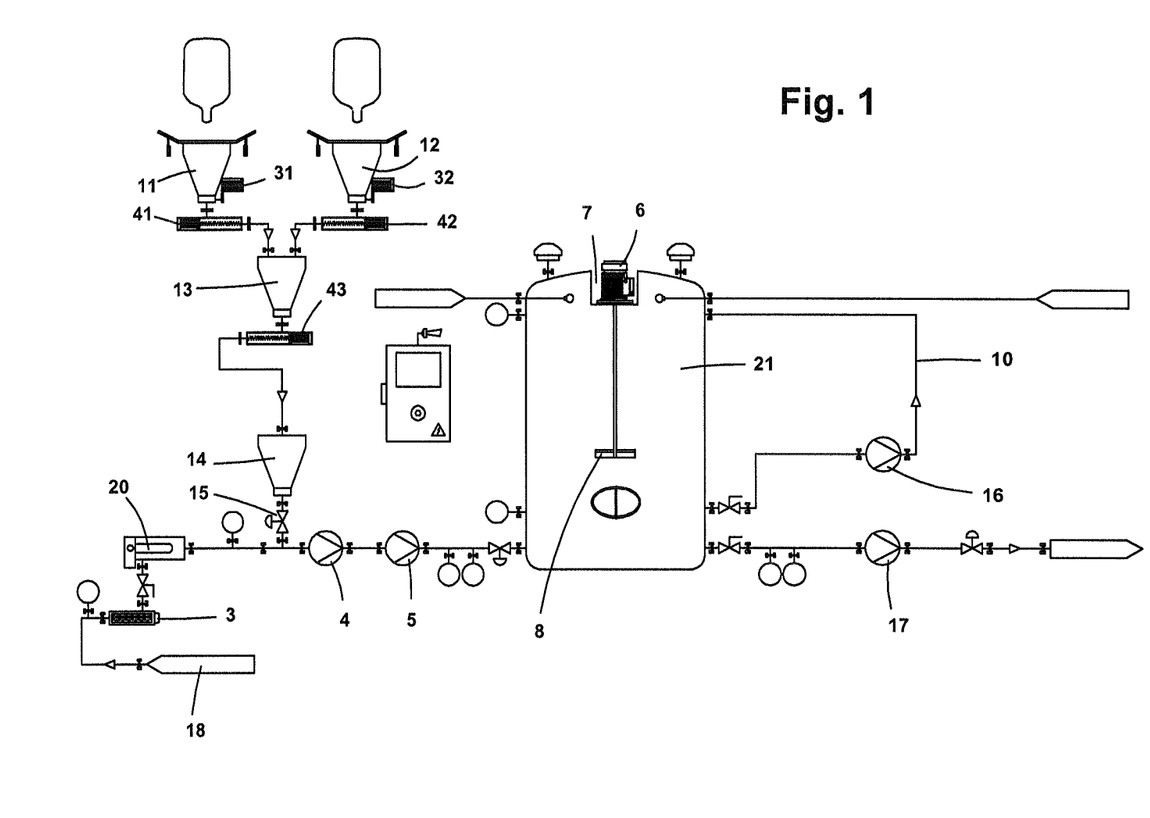
FIG. 1 shows a view of a diagram of the apparatus disclosed in the invention.

The inlet line (18) is provided with a filter (3) which enables eliminating the particles circulating with the water, and possibly with a heating element (20) so that the water has a minimum operating temperature (over 3° C.). Under this temperature the heating element (20) will come on and heat up the water as far as necessary to be able to proceed to the dissolving process.

One or more boron compounds, normally borax, and a pH regulator are supplied into the inlet line. The supply device is located in the first unit (1). This first unit (1) comprises a reception hopper (11,12) for each of the components and is provided with crushers (31,32) and dispensers (41,42). The components are inserted in a mixing hopper (13), which in turn comprises a dispenser (43), which pour onto a body (14) for insertion of the mixed product in the flow line of inlet water, already at the minimum operating temperature. This insertion body (14) is isolated from said flow line by means of the proper valve (15).

Figure 2:
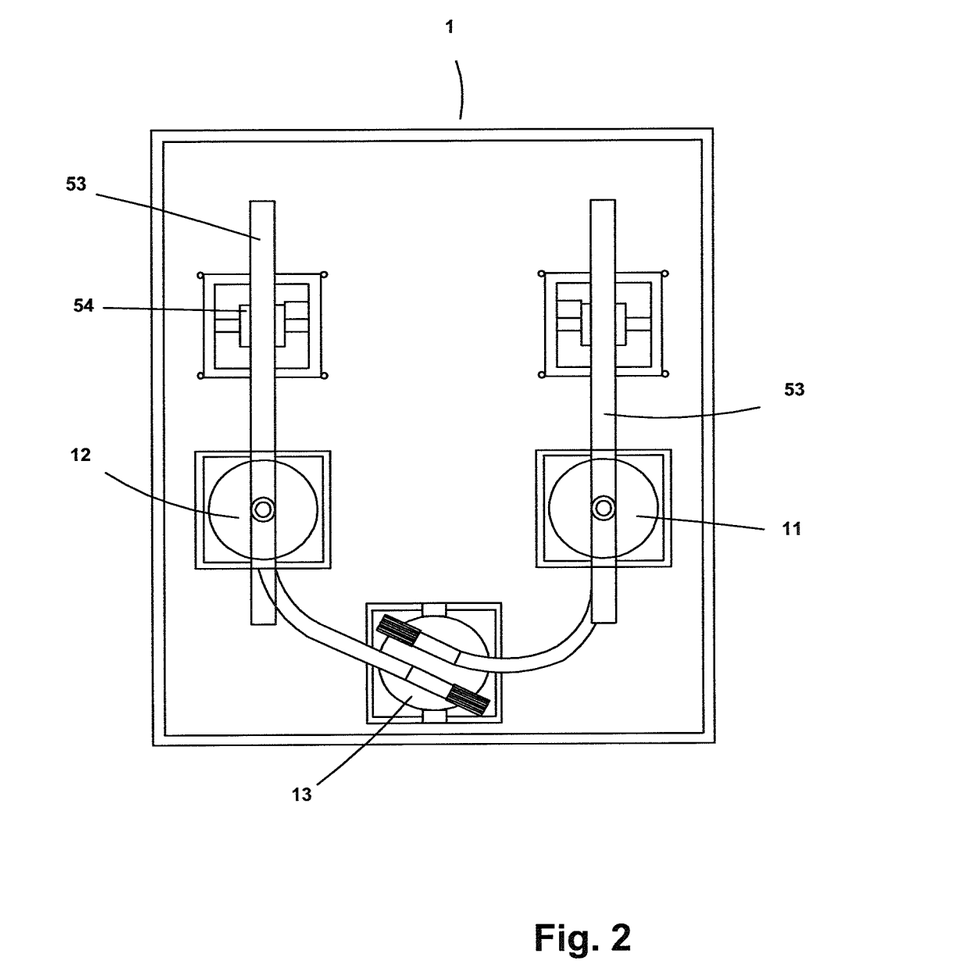
FIG. 2 shows a plan view of a first dispensing unit.
Figure 3:
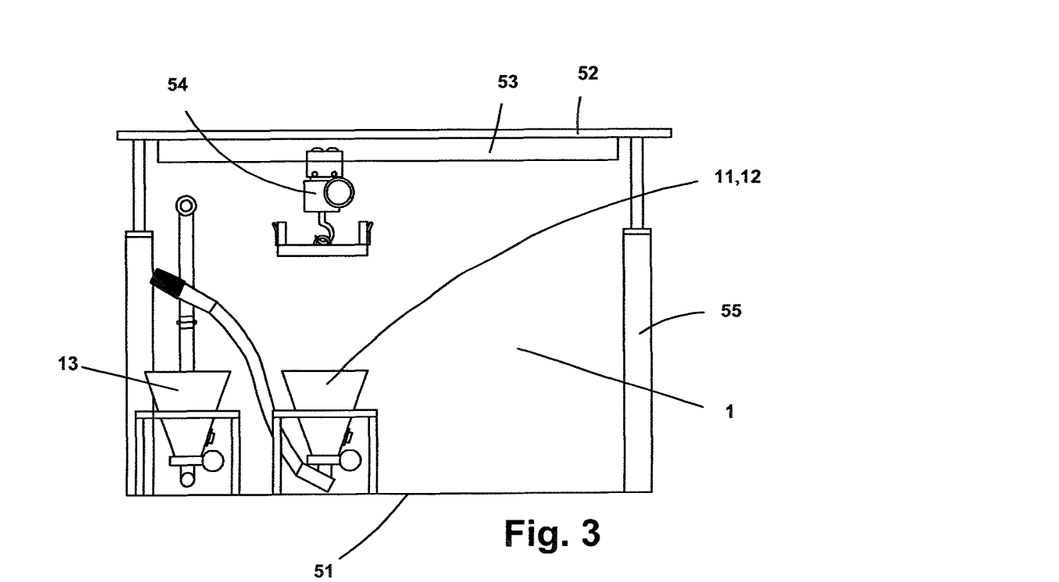
FIG. 3 shows a side view of the unit from FIG. 2 in a first, transport, position.
Figure 4:
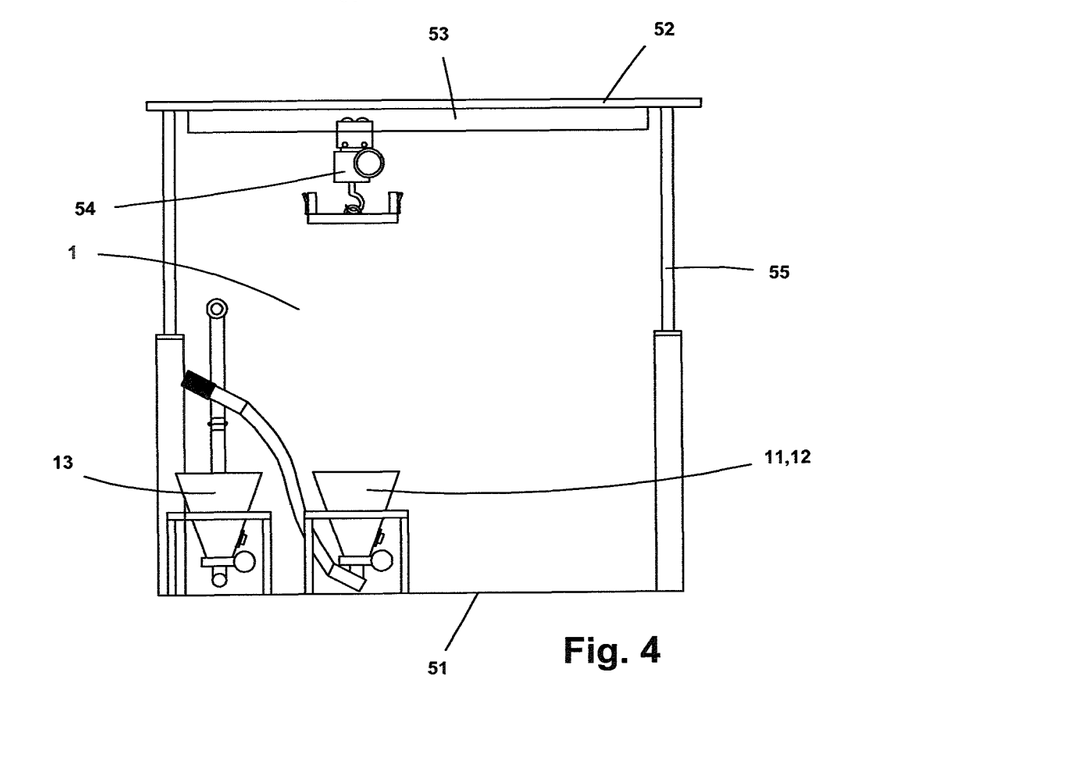
FIG. 4 shows a side view of the unit from FIGS. 2 and 3 in a second, operating, position.
Figure 5:
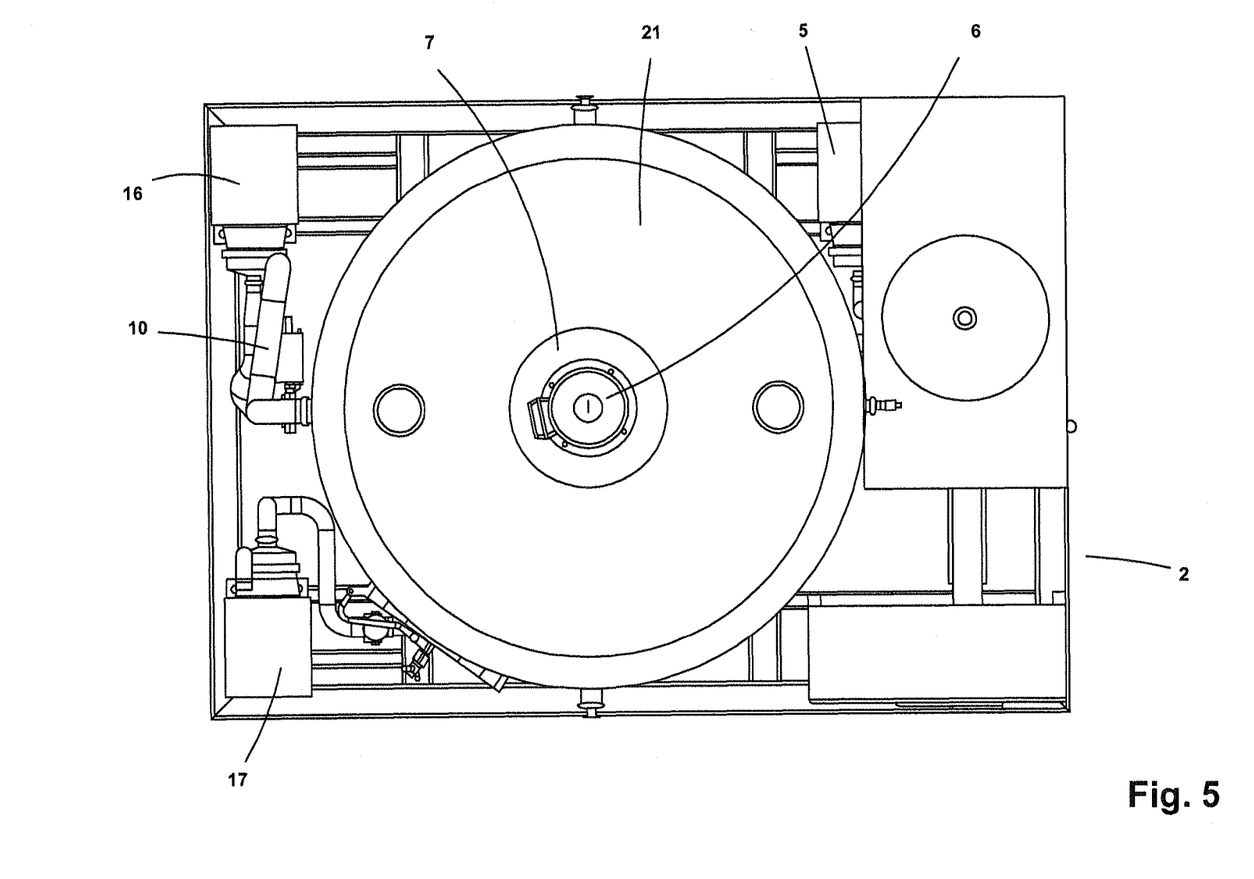
FIG. 5 shows a plan view of a second unit, for mixing and pumping.
Figure 6:
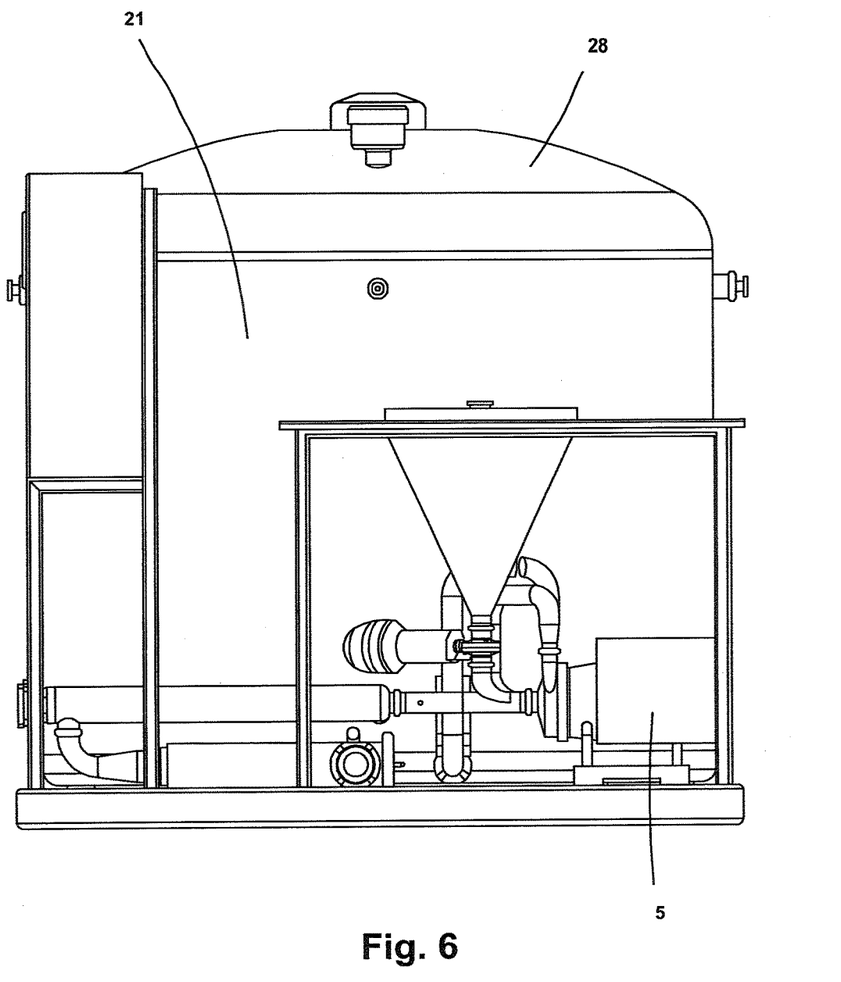
FIG. 6 shows a front view of the unit of FIG. 5.
Figure 7:
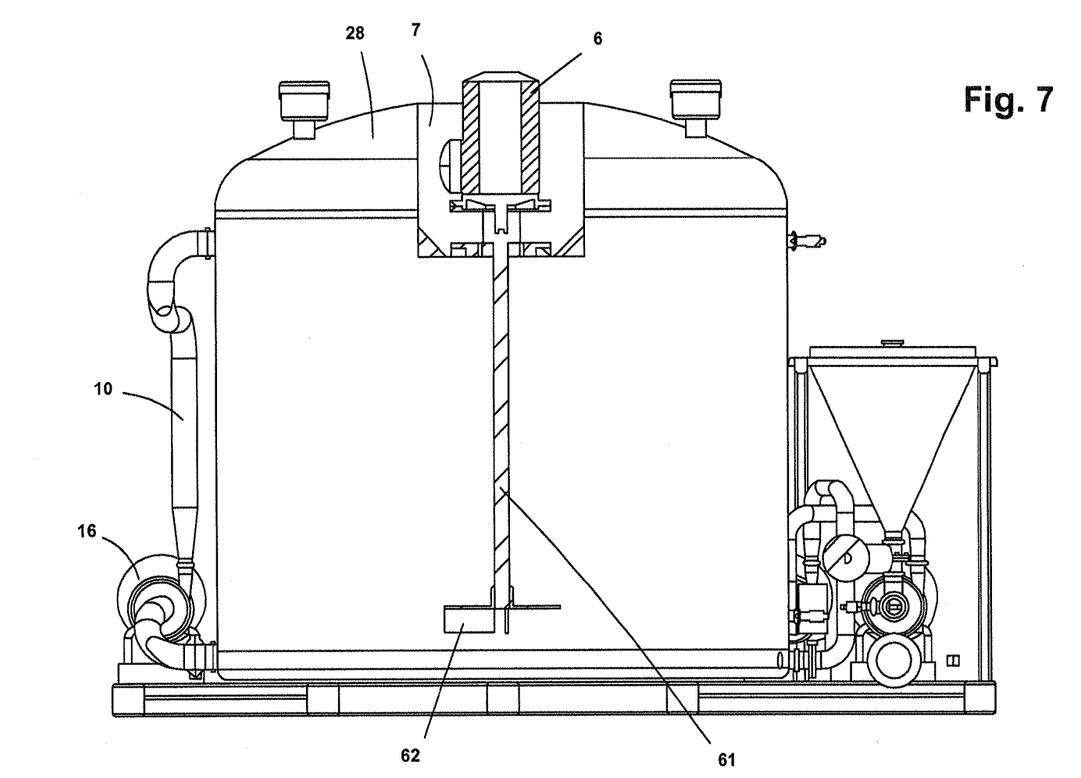
FIG. 7 shows a side view of the unit from FIGS. 5 and 6.
Figure 8:
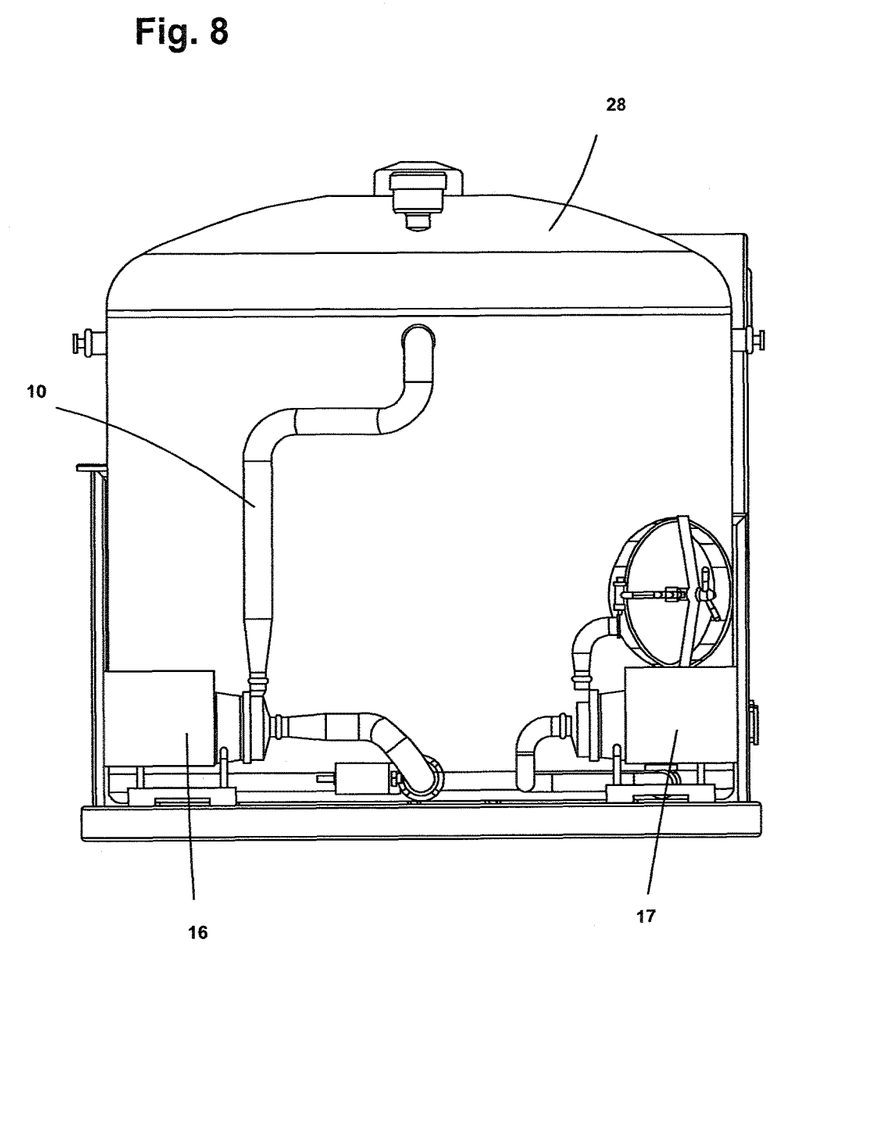
FIG. 8 shows a rear view of the unit from FIGS. 5 to 7, in which the pumping means can be appreciated.

This first unit (1) is integrated in a cage or container which holds the set of items for reception, filtration or heating of the water. This cage or container is made up of a base body (51) and a roof (52). The roof (52) is connected to the base body by means of a set of extendible bodies (55). These extendible bodies can be made up of pneumatic or hydraulic cylinders or mechanical slides either driven by electric motors or manually operated. When operating, the extendible bodies extend, lifting the roof (52), and with this one or more crane-bodies (54) integrated in said roof (52). The crane-body (54) is made up of a hoist which can slide along a bar or beam (53), as was stated, joined to the roof. According to a preferred embodiment, said bar or beam (53) can be extended by hinging an end portion, telescopically, or by mechanical coupling of a supplement. The hoist can thus slide from the vertical area of a positioning zone for "big bags" containing the product to the corresponding dispensing zone, and is able to pour material and fill the relevant hopper easily. Normally each of the reception hoppers will have a corresponding crane-body (54). The material poured from the reception hoppers (11,12) is taken to the mixer hopper (13), and from this to the introduction body (14), and the mix is pumped to the second unit by means of a pump, for example (4).

The second unit (2) comprises the reactor (21). This also comprises discharge means (5) for the mix entering this reactor, a discharge pump (17) for the mix for its outside usage, as well as a recirculation pump (16) which reinserts any unused product in the reactor through the line (10). The reactor (21) consists of a tank provided with or forming a roof (28), which has been provided with a concavity (7) in which a motor (6) is housed in order to obtain the maximum capacity with the minimum height. The motor (6) is extended in an axle (61) which moves a drive paddle (62) at the bottom. The paddle (62) is preferably made up of a disk perpendicular to the axle, from which radial or eccentrically arranged paddles emerge, on a plane parallel to the motor axle.

The apparatus is complemented with an electricity-generating set for the electricity supply of the apparatus systems, and a cabinet for keeping tools and auxiliary items, such as hoses for joining the units together.

The invention claimed is:

1. A portable apparatus for borating a continuous flow of water, comprising:
    dispensing assemblies, provided with corresponding crushers and feeders,
    a feeder for supplying an output of the dispensing assemblies into water in a water circuit in order to provide a mix,
    at least one of a flow gauge and a regulator for matching a concentration of products supplied into the water,
    a mixing reactor with a mechanical mixer,
    a first pumping arrangement connected to the mixing reactor for supplying the mix to the mixing reactor,
    a second pumping arrangement connected to the mixing reactor for supply of an output solution from the mixing reactor,
    wherein the portable apparatus is made up of two independent units including:
        a first unit, which comprises a dispensing mechanism including said dispensing assemblies, the feeder, the at least one of a flow gauge and the regulator, and a loading device for the dispensing assemblies, and
        a second unit, which comprises a mixing mechanism including the mixing reactor and the second pumping arrangement to discharge the output solution towards an installation where the output solution is needed,
    wherein the mixing mechanism further includes a recirculation line for recirculating the output solution back to the mixing reactor,
    a container for each said independent unit, and the containers are adapted to be interconnected by corresponding lines,
    wherein the container which forms the first unit includes:
        a lower part, which holds the dispensing mechanism including said dispensing assemblies, the feeder, the at least one of the flow gauge and the regulator, and the loading device,
        an upper part which holds a roof, and
        at least one of a mechanical, hydraulic pneumatic electrical arrangement for telescopically moving the roof from a first transport position to a second, operating position.

2. A portable apparatus for borating a continuous flow of water according to claim 1, wherein at least the first unit comprises at least one crane integrated in at least the first unit.

3. A portable apparatus for borating a continuous flow of water according to claim 2, wherein at least one said crane is provided for each dispensing assembly.

4. A portable apparatus for borating a continuous flow of water according to claim 2, wherein each crane includes a track and a hoist movable along the track.

5. A portable apparatus for borating a continuous flow of water according to claim 4, wherein the crane is extendible, so that the crane is adapted to be withdrawn and retracted in the transport position and extended in the operating position.

6. A portable apparatus for borating a continuous flow of water according to claim 2, wherein the mixing reactor comprises:
    a main inlet line for the flow of water including borated compounds;
    said recirculation line;
    a supply line;

an upper motor integrated in a hollow made at a top thereof;
venting ducts;
an agitation paddle connected to the upper motor;
access holes for cleaning; and
an insulating envelope for thermal protection.

7. A portable apparatus for borating a continuous flow of water according to claim 6, wherein the agitation paddle includes an impeller, formed of a disk perpendicular to a rotation axis thereof, provided with one of radial and eccentrically arranged paddles perpendicular to said disk.

8. A portable apparatus for borating a continuous flow of water according to claim 1, wherein the dispensing assemblies form supply units, each of these comprising corresponding ones of said crushers and feeders.

9. A portable apparatus for borating a continuous flow of water according to claim 1, wherein the feeder to the water circuit forms a water supply line which is provided with a filtration arrangement, and is also provided with a heating arrangement.

10. A portable apparatus for borating a continuous flow of water according to claim 1, further comprising a heating arrangement in the reactor, in one of:
an inlet line thereof, and
the mixing reactor.

11. A portable apparatus for borating a continuous flow of water, according to claim 1, further comprising an electricity generating set for a power supply of systems in the apparatus, and a cabinet for keeping tools, auxiliary items, and hoses for joining the units together.

* * * * *